(12) United States Patent
Watanabe et al.

(10) Patent No.: US 9,203,066 B2
(45) Date of Patent: Dec. 1, 2015

(54) BATTERY PACK

(71) Applicant: Lithium Energy Japan, Kyoto-shi (JP)

(72) Inventors: Minoru Watanabe, Shiga (JP); Toshiki Kusunoki, Shiga (JP); Shinpei Ono, Shiga (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 170 days.

(21) Appl. No.: 13/629,271

(22) Filed: Sep. 27, 2012

(65) Prior Publication Data

US 2013/0084477 A1     Apr. 4, 2013

(30) Foreign Application Priority Data

Sep. 30, 2011   (JP) .................................. 2011-217060
Sep. 6, 2012    (JP) .................................. 2012-195976

(51) Int. Cl.
| | | |
|---|---|---|
| *H01M 2/12* | (2006.01) | |
| *H01M 2/10* | (2006.01) | |
| *H01M 10/625* | (2014.01) | |
| *H01M 10/6563* | (2014.01) | |
| *H01M 10/667* | (2014.01) | |
| *H01M 10/6566* | (2014.01) | |
| *H01M 10/613* | (2014.01) | |

(52) U.S. Cl.
CPC .......... *H01M 2/1077* (2013.01); *H01M 10/613* (2015.04); *H01M 10/625* (2015.04); *H01M 10/6563* (2015.04); *H01M 10/6566* (2015.04); *H01M 10/667* (2015.04)

(58) Field of Classification Search
CPC ..................... H01M 10/5097; H01M 10/5067; H01M 2/1077
USPC .......................................................... 429/82
See application file for complete search history.

(56) References Cited

U.S. PATENT DOCUMENTS

| | | | |
|---|---|---|---|
| 6,828,755 B1 | 12/2004 | Iverson et al. | |
| 2008/0062622 A1* | 3/2008 | Fukazu et al. | ................ 361/678 |
| 2010/0297486 A1* | 11/2010 | Fujii | ............................ 429/120 |

FOREIGN PATENT DOCUMENTS

| | | |
|---|---|---|
| EP | 1 897 739 A1 | 3/2008 |
| EP | 2 026 404 A1 | 2/2009 |
| JP | 2008-251378 A | 10/2008 |

OTHER PUBLICATIONS

European Search Report dated Jan. 30, 2013.
United States Office Action dated May 12, 2015 in co-pending U.S. Appl. No. 13/631,499.

* cited by examiner

*Primary Examiner* — Nicholas P D'Aniello
(74) *Attorney, Agent, or Firm* — McGinn IP Law Group, PLLC.

(57) ABSTRACT

A battery and an electrical apparatus accommodated in a battery pack body (1, 4) are effectively cooled. The battery pack body (1, 4) includes a battery region in which a battery module (2) is accommodated and an electrical apparatus region in which the electrical apparatus is accommodated. An air-suction portion (3) and an air-exhaust portion (37) are formed in the battery pack body (1, 4). Air which flows through the air-suction portion (36) is made to flow in the battery pack body (1, 4), thereby cooling the battery module (2) and the electrical apparatus and then, the air is made to flow out through the air-exhaust portion (37). The electrical apparatus region includes an electrical apparatus cover (27) which covers at least a portion of the electrical apparatus and which branches air which is sucked through the air-suction portion.

20 Claims, 7 Drawing Sheets

BATTERY PACK

CROSS-REFERENCE TO RELATED APPLICATIONS

This application claims priority from Japanese Patent Application Nos. 2011-217060 and 2012-195976, the disclosures of which are incorporated herein by reference in their entireties.

BACKGROUND OF THE INVENTION

1. Field of the Invention

The present invention relates to a battery pack, more particularly, to a battery pack having characteristics in its cooling structure of a battery and an electrical apparatus accommodated in the battery pack.

2. Description of the Related Art

As a conventional battery pack, there is a battery pack including a passage which is designed such that a cooling medium sucked from outside of the battery pack passes through an interior of an electric storage mechanism provided on an upstream side, the cooling medium flows along an outer periphery of a zone in which an electrical apparatus provided on a downstream side is accommodated, and the cooling medium is discharged outside of the battery pack. This battery pack also includes a cooling fan for allowing the cooling medium to flow into the passage. An opening is formed in a wall surface of the passage which is adjacent to the zone in which the electrical apparatus is accommodated, and a space in the zone and the passage are in communication with each other through this opening (see JP 2008-251378 A for example).

According to the conventional battery pack, however, since the electrical apparatus is cooled by cooling refrigerant, the opening is merely formed in the wall surface of the passage which is adjacent to the zone in which the electrical apparatus is accommodated. Hence, it is difficult to effectively cool the accommodated batteries.

SUMMARY OF THE INVENTION

It is an object of the present invention to provide a battery pack having a structure capable of effectively cooling batteries accommodated in a battery pack body.

According to an aspect of the invention, a battery pack in which an air-suction portion and an air-exhaust portion are formed in a battery pack body includes a battery region accommodating a battery therein and an electrical apparatus region accommodating an electrical apparatus therein, wherein the electrical apparatus region includes an electrical apparatus cover which covers at least a portion of the electrical apparatus, and which branches air sucked through the air-suction portion.

The electrical apparatus cover branches air which flows in. The batteries can effectively be cooled by flowing the branched air to the battery region.

According to an aspect of the invention, the electrical apparatus region may include a junction box having a control substrate, and the electrical apparatus cover includes a substrate cover which covers the control substrate.

After the electrical apparatuses including the control substrate are mounted in the junction box, the air flow can be branched by the substrate cover which covers the control substrate. Hence, it is possible to freely design the airflow only by changing the shape of the substrate cover.

According to an aspect of the invention, the electrical apparatus cover may include a first surface which allows air sucked through the air-suction portion to flow in a first flowing direction, and a second surface which allows air sucked through the air-suction portion to flow in a second flowing direction.

It is possible to reliably branch a flow of air sucked through the air-suction portion in the first flowing direction and the second flowing direction with the first surface and the second surface.

According to an aspect of the invention, the battery pack body may include a box-shaped battery pack case whose upper surface is opened, and a battery pack cover which closes the opening, the air-suction portion and the air-exhaust portion are formed at diagonal positions of the battery pack cover, the electrical apparatus cover is disposed along a portion of one of sides of the battery pack case, the first surface is disposed such that air which flows from the air-suction portion is made to flow in a first flowing direction along the side, and the second surface is disposed such that air intersects with the side and flows in a second flowing direction toward the remaining other side.

Air which flows in from the air-suction portion can be made to flow in the first flowing direction and the second flowing direction along the electrical apparatus cover. Air which flows in these directions flows toward the air-exhaust portion disposed at the diagonal position with respect to the air-suction portion. Therefore, the air flow toward the batteries can be made smooth and the deviation of air flow can be eliminated, and it is possible to effectively cool the batteries.

According to an aspect of the invention, the battery pack body may include a box-shaped battery pack case whose upper surface is opened, and a battery pack cover which closes the opening, the electrical apparatus region divides an interior of the battery pack case in a longitudinal direction thereof, the electrical apparatus cover is disposed along a portion of one of sides of the battery pack case, the first surface is disposed such that air which flows from the air-suction portion is made to flow in a first flowing direction along the side, and the second surface is disposed such that air intersects with the side and flows in a second flowing direction toward the remaining other side.

Air which flows in through the air-suction portion flows through the battery regions divided by the electrical apparatus region toward the air-exhaust portion. Therefore, the air flow toward the batteries can be made smooth and deviation of air flow can be eliminated, and it is possible to effectively cool the batteries.

According to an aspect of the invention, the electrical apparatus cover may be located on both sides of the electrical apparatus region, and the electrical apparatus cover forms a pair of flow paths which intersect with one of sides of the battery pack case.

Since it is possible to increase a contact area between the electrical apparatus cover and air which passes therethrough, the electrical apparatus region can effectively be cooled.

According to an aspect of the invention, a plurality of batteries may be arranged in parallel to one another in the battery region along the first flowing direction and the second flowing direction.

No matter which one of the first flowing direction and the second flowing direction the air flows, the batteries can effectively be cooled.

According to an aspect of the invention, the first surface of the electrical apparatus cover may be located closer to the second flowing direction than the battery located downstream of the first flowing direction.

After air which flows in the first flowing direction passes through the first surface of the electrical apparatus cover, the air partially collides against a portion of the battery, and the air can easily flow in the second flowing direction along the second surface.

According to an aspect of the invention, the electrical apparatus cover may be made of metal material having excellent thermal conductivity.

It is possible to more effectively cool the electrical apparatus region.

Since it is possible to cool the electrical apparatus region and to change the air flow at the same time by the electrical apparatus cover, the members in the battery pack body can effectively be cooled without complicating the structure.

PREFERRED EMBODIMENT

An embodiment of the present invention will be described in accordance with the accompanying drawings. Although terms (e.g., terms including "up", "down", "side" and "end") indicating specific direction and position are used when needed in the following description, these terms are used to facilitate understanding of the invention with reference to the drawings, and the technical scope of the invention is not limited by the meanings of these terms. The following description is substantially merely exemplification, and the description is not intended to limit the invention, a subject to which the invention is applied, and usage of the invention.

Figure 1:
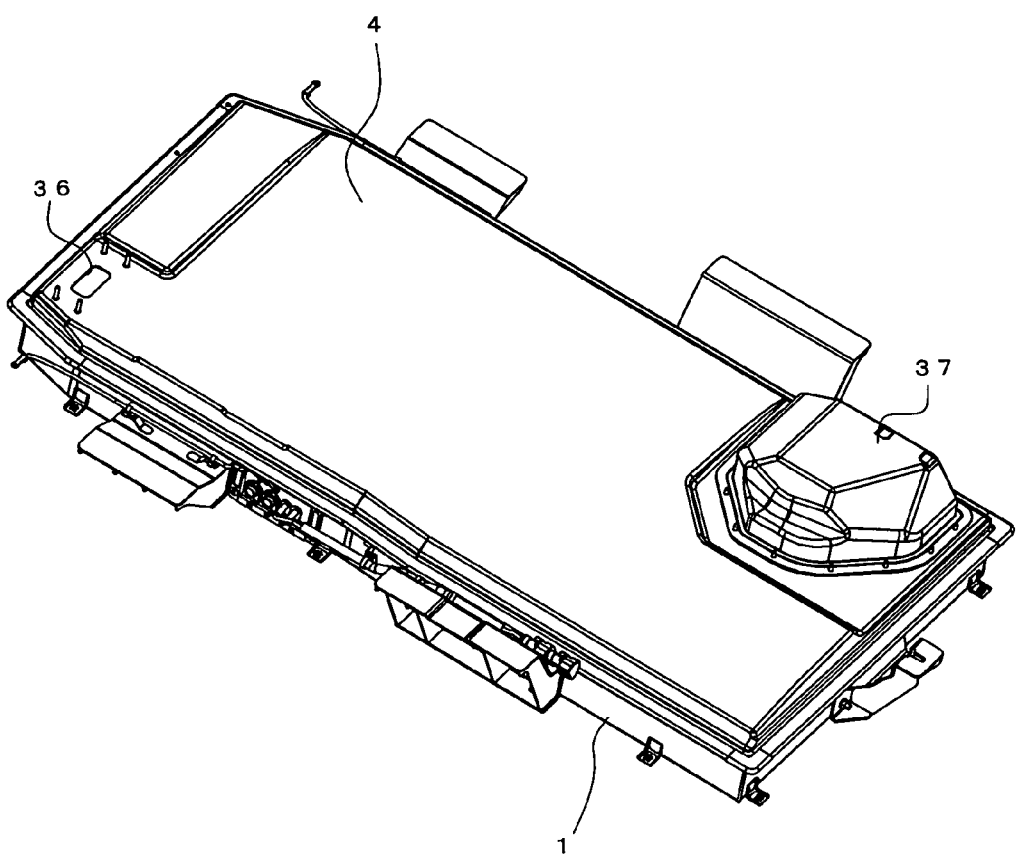
FIG. 1 is a perspective view of a battery pack according to an embodiment.
Figure 2:
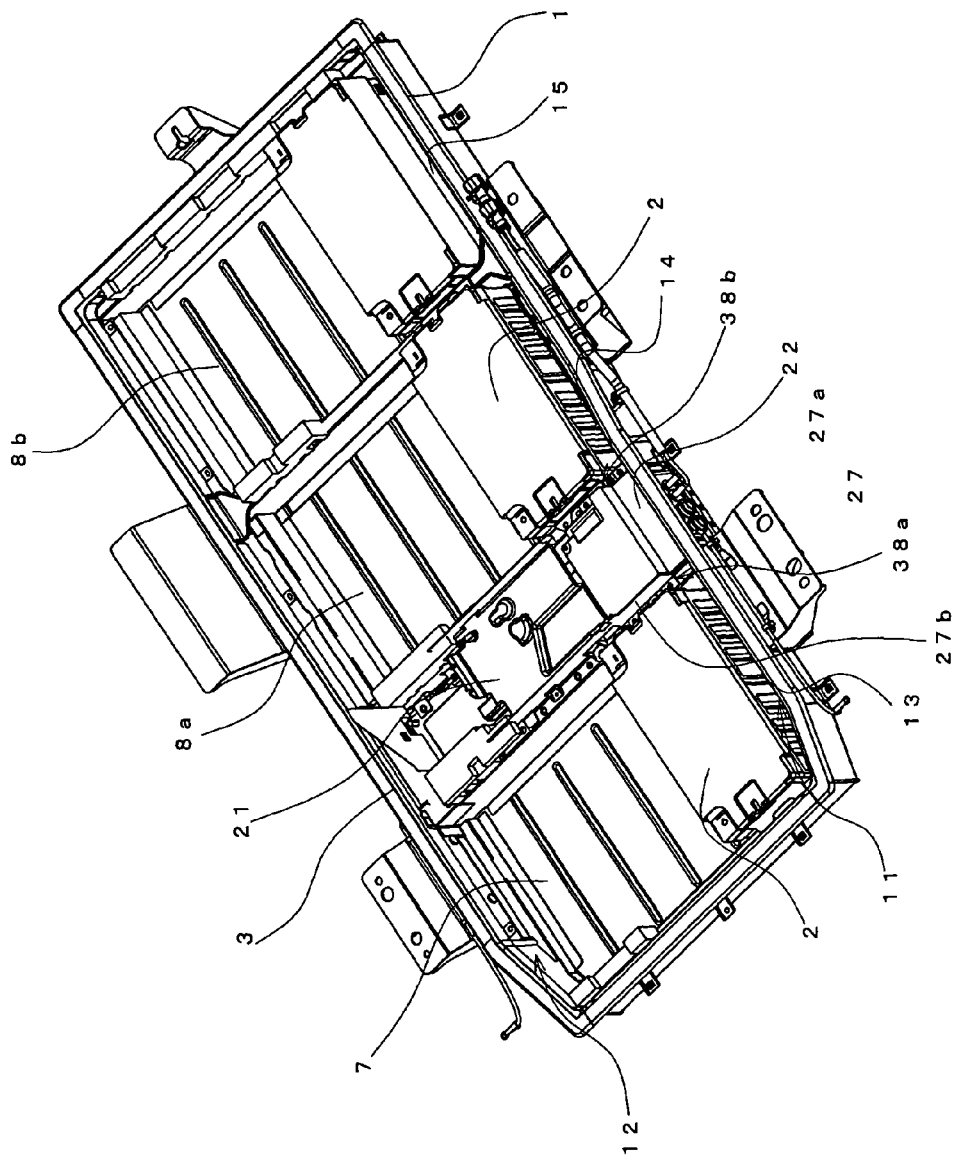
FIG. 2 is a perspective view showing a state where a battery pack cover and a portion of a battery module are removed from FIG. 1.

FIGS. 1 and 2 show a battery pack according to the embodiment. According to the battery pack, a plurality of battery modules 2 and a junction box 3 are accommodated in a battery pack case 1, and the battery pack case 1 is closed with a battery pack cover 4.

Figure 3:
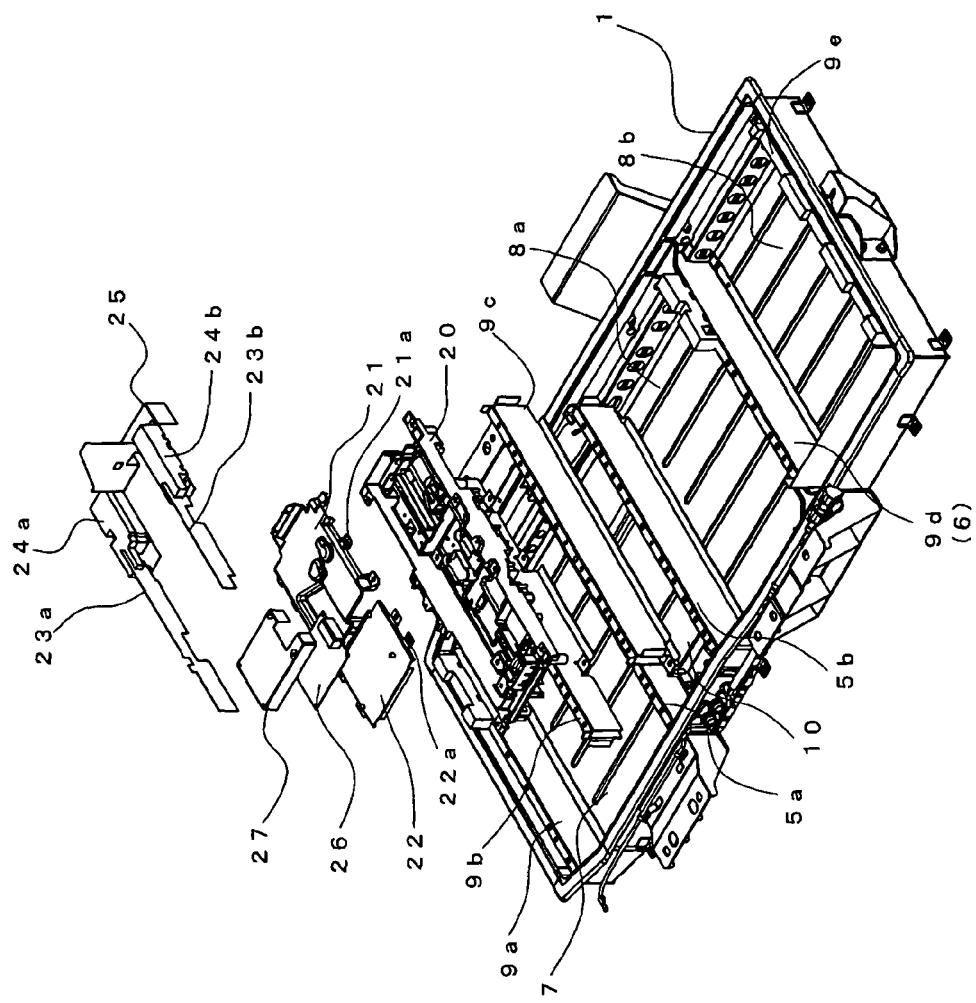
FIG. 3 is a perspective view showing a state where a guide member and members in a junction box are disassembled from FIG. 2.

As shown in FIG. 3, the battery pack case 1 has a substantially box-like shape whose upper surface is opened. The battery pack case 1 is divided by two partition walls 5a and 5b and a partition portion 6 into three portions, i.e., a first battery accommodating portion 7 and second battery accommodating portions 8a and 8b. The partition walls 5a and 5b have interior spaces which are disposed at a predetermined distance from each other. Inner surfaces of both ends of the battery pack case 1, the partition walls 5a and 5b and the partition portion 6 are covered with partition covers 9a, 9b, 9c, 9d and 9e, respectively. A space between both the partition walls 5a and 5b is a junction box accommodating portion 10 (described as "JB accommodating portion" in the following description) in which the junction box 3 is disposed.

Figure 7:
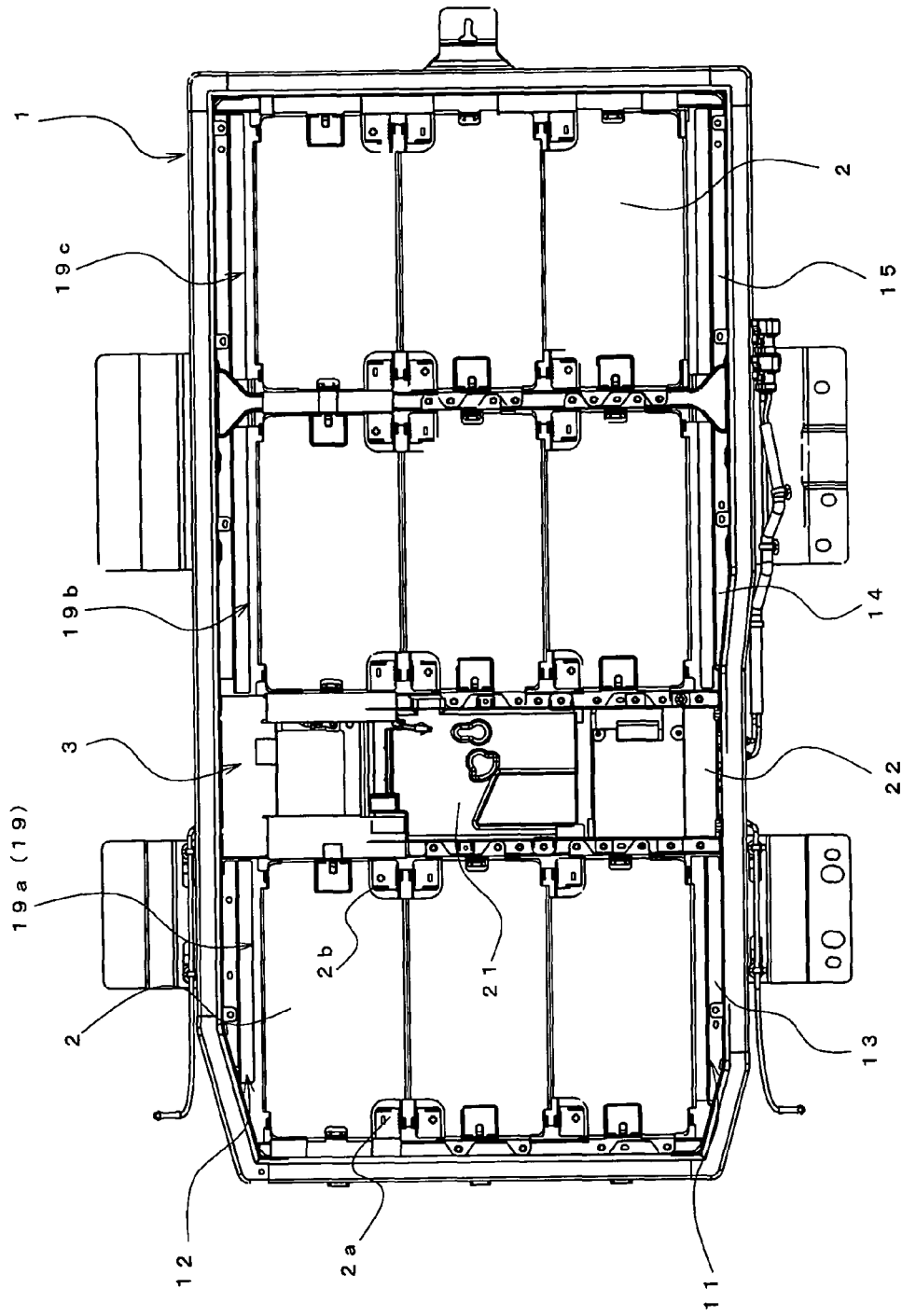
FIG. 7 is a plan view in which the battery module is added to FIG. 2.

As shown in FIGS. 2 and 7, side air flow paths (first side air flow path 11 and second side air flow path 12) are formed on both sides of the battery pack case 1 and between a sidewall and the battery modules 2. The air flow paths 11 and 12 are in communication with the battery accommodating portions 7, 8a and 8b. In the following description, regions divided by the side air flow paths 11 and 12 are called as a first region 13, a second region 14 and a third region 15 in this order from an upstream side of air flow.

Figure 6:
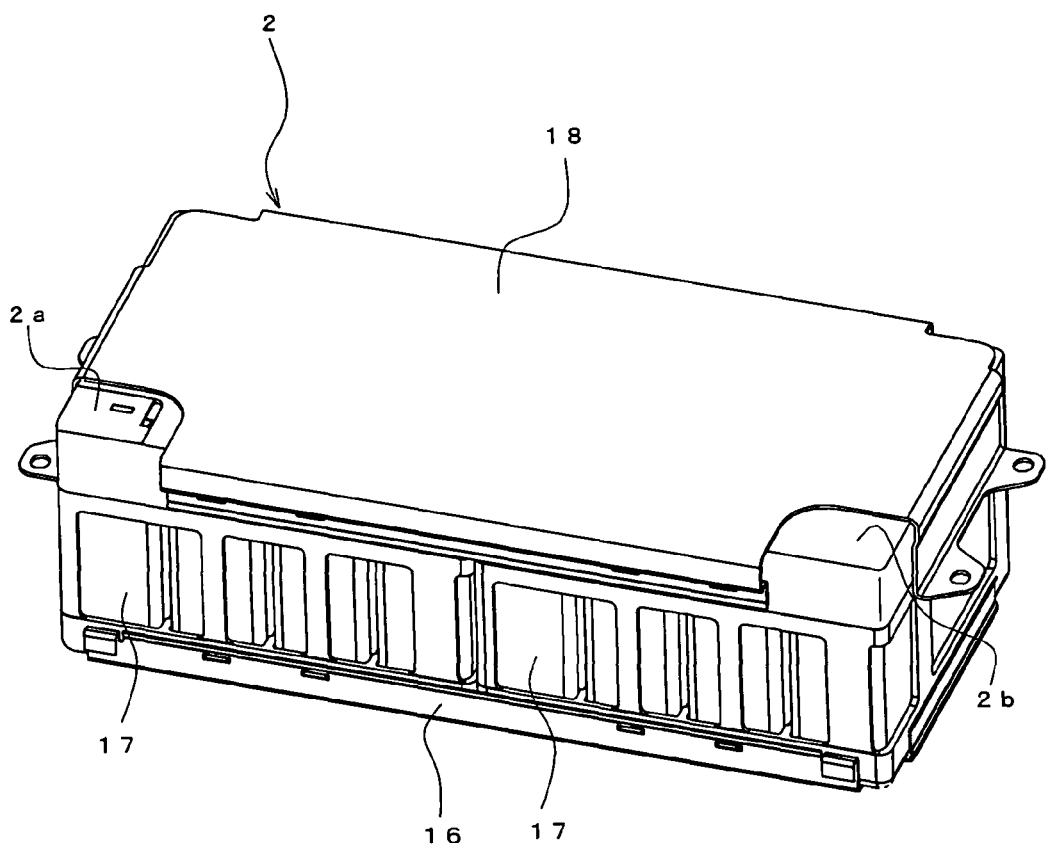
FIG. 6 is a perspective view of the battery module shown in FIG. 2.

As shown in FIG. 6, the battery module 2 is formed by accommodating a plurality of battery cells 17 at predetermined distances from one another in a battery module case 16, and by covering the battery module case 16 with a battery module cover 18. As shown in FIG. 7, a plurality of battery module groups 19 (first module group 19a, second module group 19b and third module group 19c) arranged in parallel to one another are accommodated in the battery accommodating portions 7, 8a and 8b.

The battery cells 17 are electrically connected to one another in series. Each of the battery cells 17 is a non-aqueous electrolytic secondary battery such as a lithium-ion battery. The battery cell 17 has an electricity-generating element accommodated in a battery container, and the battery container is sealed using a lid body. A plurality of openings are formed in the battery module case 16, air is made to flow between the battery cells 17 to cool the battery cells 17.

Positive and negative fixed electrode sections 2a and 2b are exposed from both ends of a side edge of the battery module 2. Here, all of the battery modules 2 have the same structures, and directions when the battery modules 2 are disposed in the battery pack case 1 are different from one another.

As shown in FIG. 3, the junction box 3 has a box body 20 having an opened upper surface, the box-like box body 20 including a control unit and a sensor, a bus bar (all not shown) and the like. A wire harness (not shown) is connected to the bus bar. The control unit supplies, through the bus bar, electric power from the battery cell 17 to a vehicle in which the battery pack is mounted, and detects a remaining amount of electric power of the battery cell 17 through the wire harness (not shown), and performs management by communication with a control unit in the vehicle.

The box body 20 is covered with a junction box cover 21 and an auxiliary cover 22 made of synthetic resin having excellent insulation properties except a portion of an upper surface of the box body 20.

The junction box cover 21 is for covering the control unit and the like which are disposed on a central portion of the junction box 3 and which are essential electrical apparatuses. The junction box cover 21 includes tongue pieces 21a projecting from both sidewalls thereof, and the tongue pieces 21a are screwed to the partition walls 5a and 5b through the partition covers 9a and 9b.

Guide plates 23a and 23b are respectively disposed on both sides of the junction box cover 21 along the partition walls 5. The guide plate 23a located on the upstream side of air flow is longer than the guide plate 23b toward one end, and the guide plate 23a extends to a side of the auxiliary cover 22. One ends of guide blocks 24a and 24b are continuous with one ends of the guide plates 23a and 23b, and an auxiliary plate 25 is disposed between the other ends of the guide blocks 24a and 24b.

The auxiliary cover 22 is for covering one end side of the junction box 3, i.e., for covering an entire region where an electricity-leakage sensor, a bus bar and the like are disposed. Like the junction box cover 21, the auxiliary cover 22 includes tongue pieces 22a projecting from both sidewalls thereof, and the tongue pieces 22a are screwed to the partition walls 5a and 5b through the partition covers 9. A substrate 26 is provided on an upper surface of the auxiliary cover and the substrate 26 is covered with a substrate cover 27 which is one example of the electrical apparatus cover.

Figure 4:
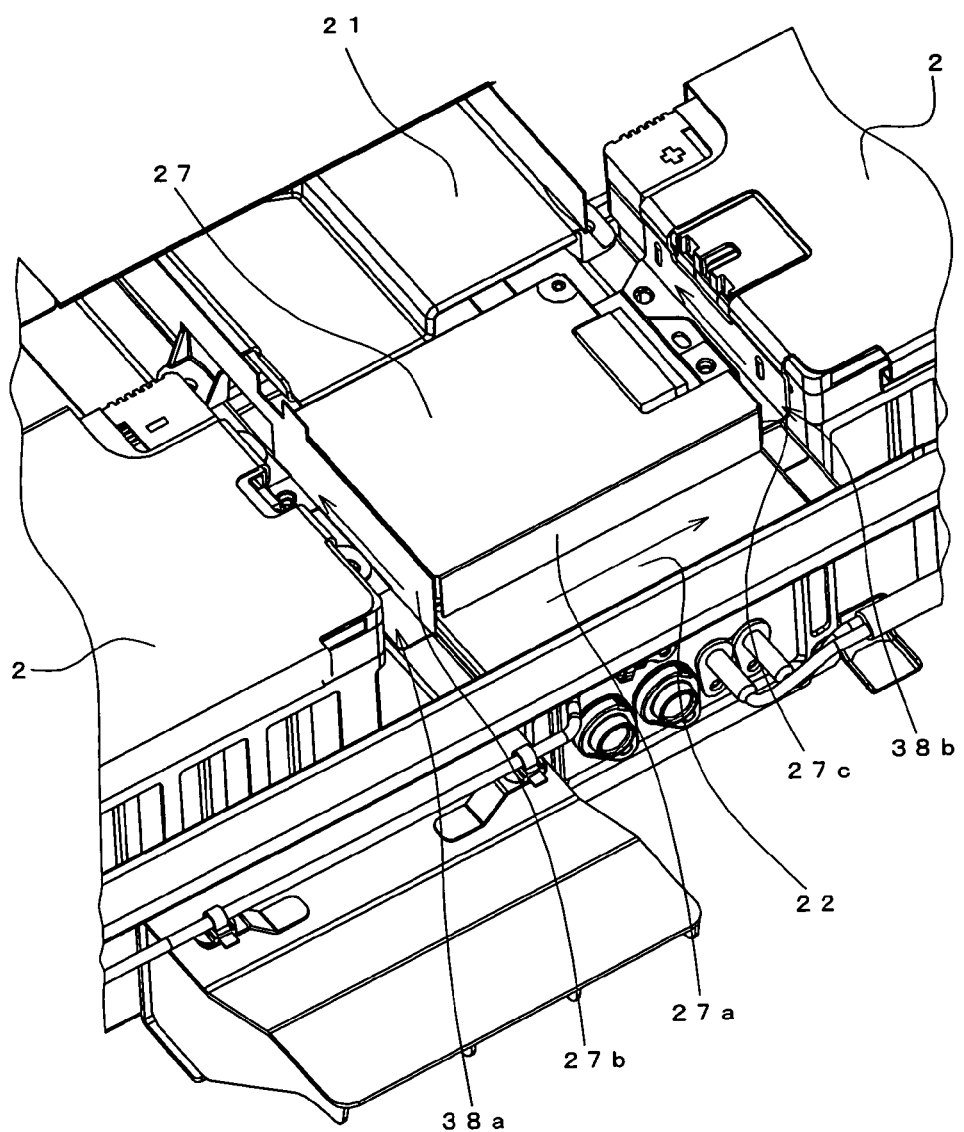
FIG. 4 is a partially enlarged view of FIG. 2.
Figure 5:
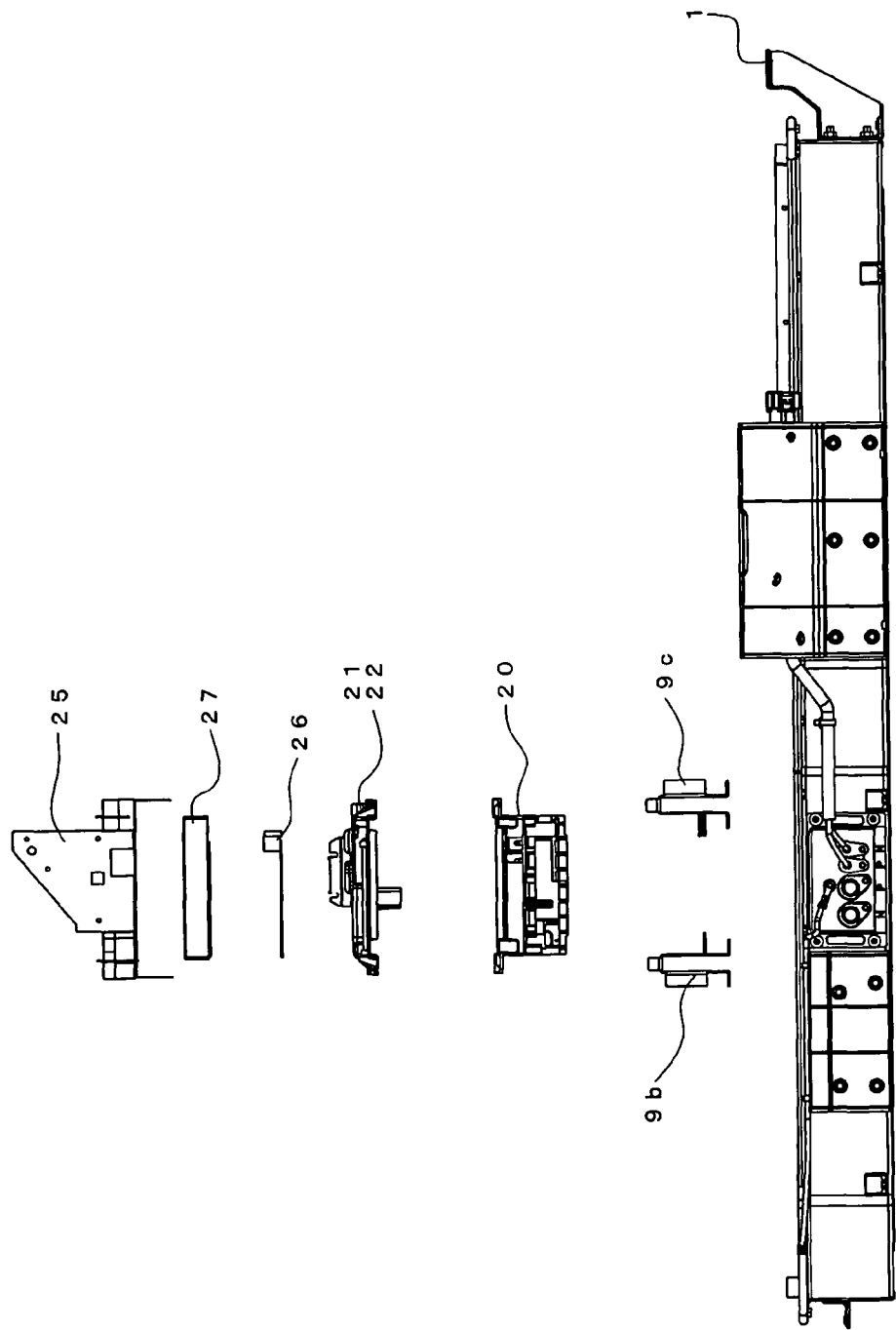
FIG. 5 is a front view of FIG. 3.

The substrate cover 27 has a box-like shape whose lower surface is opened, and an upper surface position of the substrate cover 27 is substantially equal to an upper surface position of the battery pack case 1. As shown in FIG. 4, of four side surfaces of the substrate cover 27, a first side surface 27a which is opposed to one of the sidewalls of the battery pack case 1 constitutes a portion of the first side air flow path 11. A pair of the side surfaces (second side surface 27b and third side surface 27c) which intersect with the first side surface 27a at right angles constitutes, in cooperation with end surfaces of the adjacent battery modules 2, a pair of cross air flow paths 38a and 38b which intersects with the first side air flow path 11 at right angles. These cross air flow paths 38a and 38b can form a second air flow which intersects with the first air flow at right angles along the first side air flow path 11. Especially, in the cross air flow path 38b, the first side surface 27a is formed at a position dented, toward the second side air flow path 12, from a side surface of the battery module 2 located on the downstream side of the first side air flow path 11. Hence, air which collides against the end surface of the battery module 2 easily flows toward the cross air flow path 38b. The substrate cover 27 is designed so that it can be detached from the auxiliary cover 22, and it is possible to change the air flow even at a later stage by re-mounting a substrate cover 27 of another type.

As shown in FIG. 1, the battery pack cover 4 is a plate-like body for covering an upper opening of the battery pack case 1, and an air-suction portion 36 and an air-exhaust portion 37 are respectively formed at diagonal positions of the battery pack cover 4. The air-suction portion 36 includes a rectangular opening and the air-suction portion 36 is connected to an air conditioner in the vehicle so that cold wind can be supplied.

Next, a flowing state of air in the battery pack having the above-described configuration will be described.

Air supplied from the air-suction portion 36 flows into the first region 13 of the first side air flow path 11. A portion of the air which flows into the first region 13 flows through the first side air flow path 11 toward the downstream side, and remaining air flows through the first battery accommodating portion 7 toward the second side air flow path 12. According to this configuration, the battery cells 17 of the battery module groups 19 disposed in the first battery accommodating portion 7 are cooled.

Air which flows through the first side air flow path 11 to the downstream side flows in the following manner in a portion of the first side air flow path 11 which is constituted by the first side surface 27a of the substrate cover 27 and the like.

That is, the substrate cover 27 is mounted on the upper surface of the auxiliary cover 22, and the first side surface 27a, one of the sidewalls and the guide plates 23 constitute a portion of the first side air flow path 11. Both side surfaces (second side surface 27b and third side surface 27c) of the substrate cover 27, end surfaces of the adjacent battery modules 2, and the battery pack cover 4 constitute the pair of cross air flow paths 38a and 38b which intersects with the first side air flow path 11 at right angles. Therefore, a portion of air flows through the pair of cross air flow paths 38a and 38b extending along the junction box 3 toward the second side air flow path 12. Especially, in the cross air flow path 38b, the first side surface 27a is located at a position dented toward the second side air flow path 12 from the battery module 2 located on the downstream side of the first side air flow path 11. Hence, a portion of air which flows through the first side air flow path 11 collides against the end surface of the battery module 2, and the air easily flows into the cross air flow path 38b.

Since it is possible to efficiently supply cooling wind to the downstream battery cell 17 where cooling efficiency is deteriorated, it is possible to suppress the temperature difference between the battery modules 2.

As described above, it is possible to branch air flowing through the first side air flow path 11 into the cross air flow path 38a or 38b by the substrate cover 27 provided in the auxiliary cover 22 which covers portions of the electrical apparatuses accommodated in the junction box 3. Hence, it is possible to obtain air flow along the junction box 3 and along the battery accommodating portions 7 and 8a located on the both sides of the junction box. Therefore, it is possible to effectively cool the battery cells 17 of the battery modules 2 disposed in the battery accommodating portions 7 and 8a, and the electrical apparatuses accommodated in the junction box 3.

Remaining air which flows through the first side air flow path 11 to the downstream side flows into the second region 14 as it is. Air which reaches the second region 14 flows into the battery accommodating portion 8a, and air which reaches the third region 15 flows to the battery accommodating portion 8b.

In each of the battery accommodating portions 7, 8a and 8b, flowing air flows through gaps of the battery cells 17 of the battery modules 2 to cool the battery cells 17. Air which flows through the battery accommodating portions 7, 8a and 8b flows toward the second side air flow path 12. Air which reaches the first region 13 flows into the second region 14 and then, the air which reaches the second region 14 flows into the third region 15 and then, flows out from the air-exhaust portion 37.

In this manner, the air which flows through the first side air flow path 11 and reaches the second region 14 can flow into the battery accommodating portion 8a, and air which reaches the third region 15 can flow into the battery accommodating portion 8b. Therefore, it is possible to effectively cool the battery cells 17 of the battery modules 2 where the battery accommodating portions 8a and 8b are disposed.

The present invention is not limited to the configuration described in the embodiment, and the invention can variously be modified.

For example, although the upper surface portion of the junction box 3 is covered with the junction box cover 21 and the auxiliary cover 22 in the embodiment, the upper surface portion of the junction box 3 can also be covered with one integral cover.

It is possible to positively cool electronic parts by forming an opening or a gap in a portion of the cover, and by taking a portion of cooling wind into the junction box 3 in a range not affecting the cooling effect of the battery cell 17.

Although the cross air flow paths 38a and 38b intersect with the first side air flow path 11 at right angles, it is not absolutely necessary that they intersect with the first side air flow path 11 at right angles only if they intersect, and the intersecting angle may be changed in accordance with a difference of layout of the battery module 2 and 45°, 60° or the like may be employed as the intersecting angle.

The junction box cover 21, the auxiliary cover 22 and the substrate cover 27 may be made of material having excellent thermal conduction such as aluminum alloy. According to this configuration, it is possible to transmit, to a periphery, heat generated from an electrical apparatus accommodated in the junction box 3. Hence, air passing through a cross air flow path is allowed to generate heat, and the electrical apparatus can smoothly be cooled.

As the battery pack of the present invention, it is possible to employ various batteries such as a lead-acid battery in addition to the lithium-ion battery.

What is claimed is:

1. A battery pack, comprising:
   a plurality of battery modules including a first battery module and a second battery module, each battery module including a plurality of battery cells;
   an electrical apparatus;
   a battery pack body comprising an air-suction portion and an air-exhaust portion, the battery pack body including a battery pack case, an upper surface of which is open, and a battery pack cover closing the upper surface, the battery pack case including a plurality of battery regions accommodating the battery modules therein and an electrical apparatus region accommodating the electrical apparatus therein; and
   an electrical apparatus cover which is accommodated in the battery pack body and covers at least a portion of the electrical apparatus, the electrical apparatus cover including a first surface which allows air sucked through the air-suction portion to flow along the first surface in a first flowing direction and a second surface which allows the air sucked through the air-suction portion to flow along the second surface in a second flowing direction,
   wherein the first battery module is located downstream of the first surface in the first flowing direction and the second battery module is located downstream of the second surface in the second flowing direction, and
   wherein, in a plan view from the upper surface, the electrical apparatus cover is disposed between, and separates the first battery module from the second battery module.

2. The battery pack according to claim 1, wherein the electrical apparatus includes a junction box comprising a control substrate, and
   wherein the electrical apparatus cover includes a substrate cover which covers the control substrate.

3. The battery pack according to claim 1, wherein the air-suction portion and the air-exhaust portion are formed at diagonal positions of the battery pack cover, and
   wherein the electrical apparatus cover is disposed along a portion of one of sides of the battery pack case, the first surface is disposed such that air which flows from the air-suction portion is configured to flow in the first flowing direction along said one of sides of the battery pack case, and the second surface is disposed such that air intersects with said one of sides of the battery pack case and flows in the second flowing direction toward another side of the sides of the battery pack case.

4. The battery pack according to claim 1, wherein the electrical apparatus region divides an interior of the battery pack case in a longitudinal direction thereof, and
   wherein the electrical apparatus cover is disposed along a portion of one of sides of the battery pack case, the first surface is disposed such that air which flows from the air-suction portion is configured to flow in the first flowing direction along said one of sides of the battery pack case, and the second surface is disposed such that air intersects with said one of sides of the battery pack case and flows in the second flowing direction toward another side of the sides of the battery pack case.

5. The battery pack according to claim 3, wherein the electrical apparatus cover is located on both sides of the electrical apparatus region, and the electrical apparatus cover forms a pair of flow paths which intersect with one of sides of the battery pack case.

6. The battery pack according to claim 1, wherein the electrical apparatus cover comprises a metal material having excellent thermal conductivity.

7. The battery pack according to claim 1, wherein the battery pack body further includes a box-shaped battery pack case.

8. The battery pack according to claim 1, wherein the second flowing direction intersects with the first flowing direction at an intersection of the first surface with the second surface.

9. The battery pack according to claim 8, wherein the intersection of the first surface with the second surface includes a corner of the electrical apparatus cover such that the air sucked through the air-suction portion splits toward the first flowing direction and the second flowing direction at the corner of the electrical apparatus cover.

10. The battery pack according to claim 1, wherein the battery pack body further includes a bottom wall, the first and second flowing directions being substantially parallel to the bottom wall of the battery pack body.

11. The battery pack according to claim 10, wherein the battery pack body further includes a sidewall, the sidewall of the battery pack body and the first surface of the electrical apparatus cover defining a flow path in the first flowing direction.

12. A battery pack, comprising:
    a plurality of battery modules including a first battery module and a second battery module, each battery module including a plurality of battery cells;
    an electrical apparatus;
    a battery pack body including an air-suction portion and an air-exhaust portion, the battery pack body comprising a battery pack case, an upper surface of which is open, a battery pack cover closing the upper surface, a sidewall, a plurality of battery regions accommodating the battery modules therein, and an electrical apparatus region accommodating the electrical apparatus therein; and
    an electrical apparatus cover which covers at least a portion of the electrical apparatus, the electrical apparatus cover including a first surface which allows air sucked through the air-suction portion to flow along the first surface in a first flowing direction and a second surface which allows the air sucked through the air-suction portion to flow along the second surface in a second flowing direction,
    wherein the sidewall of the battery pack body and the first surface of the electrical apparatus cover define a flow path,
    wherein the first battery module is located downstream of the first surface in the first flowing direction and the second battery module is located downstream of the second surface in the second flowing direction, and
    wherein, in a plan view from the upper surface, the electrical apparatus cover is disposed between, and separates the first battery module from the second battery module.

13. The battery pack according to claim 12, wherein the second flowing direction intersects with the first flowing direction at an intersection of the first surface with the second surface.

14. The battery pack according to claim 13, wherein the intersection of the first surface with the second surface includes a corner of the electrical apparatus cover such that the air sucked through the air-suction portion splits toward the first flowing direction and the second flowing direction at the corner of the electrical apparatus cover.

15. A battery pack, comprising:
- a plurality of battery modules including a first battery module and a second battery module, each battery module including a plurality of battery cells;
- an electrical apparatus;
- a battery pack body including an air-suction portion and an air-exhaust portion, the battery pack body comprising a battery pack case, an upper surface of which is open, a battery pack cover closing the upper surface, a bottom wall, a plurality of battery regions accommodating the battery modules therein, and an electrical apparatus region accommodating the electrical apparatus therein; and
- an electrical apparatus cover which covers at least a portion of the electrical apparatus, the electrical apparatus cover including a first surface which allows air sucked through the air-suction portion to flow along the first surface in a first flowing direction and a second surface which allows the air sucked through the air-suction portion to flow along the second surface in a second flowing direction, the second flowing direction intersecting with the first flowing direction, the first and second flowing directions being substantially parallel to the bottom wall of the battery pack body,
- wherein the first battery module is located downstream of the first surface in the first flowing direction and the second battery module is located downstream of the second surface in the second flowing direction, and
- wherein, in a plan view from the upper surface, the electrical apparatus cover is disposed between, and separates the first battery module from the second battery module.

16. The battery pack according to claim 15, wherein the battery pack body further includes a battery pack cover that covers an entirety of components enclosed by the battery pack body.

17. A battery pack, comprising:
- a plurality of battery modules including a first battery module and a second battery module, each battery module including a plurality of battery cells, the battery cells within a module of the battery modules being separated by gaps such that cooling air is configured to pass through each of the battery modules;
- an electrical apparatus;
- a battery pack body comprising an air-suction portion and an air-exhaust portion, the battery pack body including a battery pack case, an upper surface of which is open, and a battery pack cover closing the upper surface, the battery pack case including a plurality of battery regions accommodating the plurality of battery modules therein and an electrical apparatus region accommodating the electrical apparatus therein, the battery regions and the electrical apparatus region being arranged along a first direction in the battery pack body; and
- an electrical apparatus cover which covers at least a portion of the electrical apparatus, the electrical apparatus cover including a first surface which allows air sucked through the air-suction portion to flow along the first surface in a first flowing direction parallel to said first direction, and a second surface which allows the air sucked through the air-suction portion to flow along the second surface in a second flowing direction intersecting with the first flowing direction,
- wherein the battery modules are provided with openings such that the cooling air flows through the gaps between the battery cells in the second flowing direction,
- wherein the first battery module is located downstream of the first surface in the first flowing direction and the second battery module is located downstream of the second surface in the second flowing direction, and
- wherein, in a plan view from the upper surface, the electrical apparatus cover is disposed between, and separates the first battery module from the second battery module.

18. The battery pack according to claim 17, wherein the second flowing direction is perpendicular to the first flowing direction.

19. The battery pack body according to claim 1, wherein an upper surface of the battery pack includes the air-exhaust portion.

20. The battery pack body according to claim 1, wherein the first and second surfaces extend in a direction substantially perpendicular to the upper surface of the battery pack case.

* * * * *